UNITED STATES PATENT OFFICE.

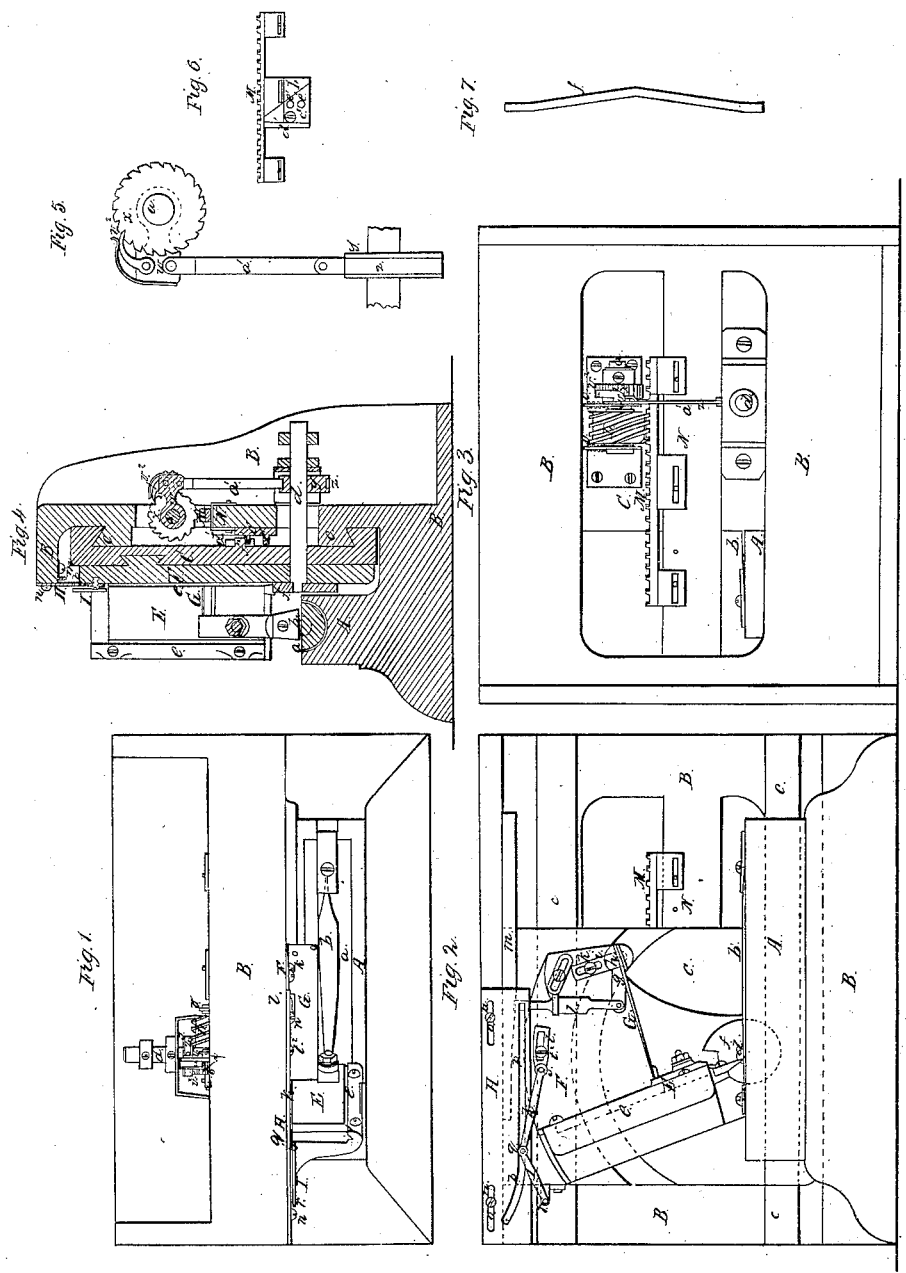

ELISHA O. POTTER, OF PAWTUCKET, RHODE ISLAND, ASSIGNOR TO HIM-
SELF AND CHAS. A. WARLAND, OF SAME PLACE.

MACHINE FOR CUTTING FILES.

Specification forming part of Letters Patent No. 41,998, dated November 8, 1864.

*To all whom it may concern:*

Be it known that I, ELISHA O. POTTER, of Pawtucket, in the county of Providence and State of Rhode Island, have invented a new and useful invention having reference to cutting Files or the formation of the teeth thereof; and I do hereby declare the same to be fully described in the following specification and represented in the accompanying drawings, of which—

Figure 1 is a top view, Fig. 2 a front elevation, Fig. 3 a rear elevation, and Fig. 4 a vertical and transverse section, of my said invention or improved machine for the formation of the teeth of files.

In carrying out my invention I combine with machinery for making in the file-blank the cuts or indentations necessary for the formation of teeth a mechanism for varying the inclination of the cutter so as to maintain such cutter at the same or the necessary angle with the curved surface of the file-blank during the process of making the teeth thereon, on whatever part of the blank the cutter may be in operation.

The faces of files as usually made are more or less curved, or are partly straight and partly curved. These curves necessarily vary the range or extent of downward movement of the cutter of a file-making machine while the file-blank may be in the act of being cut thereby, the motion of the cutter being the greatest where the file has the smallest transverse section, in which case the momentum of the cutter or its power to cut into the blank is the greatest where it should be the least.

In my improved machine is comprehended a peculiar mechanism for varying the pressure or active power of the spring by which the blow of the cutter is obtained, such mechanism for such purpose being hereinafter explained. In such machine there will also be found the cutter-stock combined with the cutter-carriage by means of a rotary or vibrating supporter, so arranged that its axis of rotation or vibration shall be on or about on a level with the upper surface of the bed and in or about in a straight line with the cutting-edge of the cutter when resting on the file-blank, the object of such arrangement being to enable the cutter, when on the blank, to be, for all practical purpose, always in prolongation of the axis of motion of the rotary supporter, in order that any rotative movement of the rotary supporter may not improperly vary the distance between any two adjacent indentations made by the cutter. There is also in the said improved machine, and combined with the stationary bed and the mechanism for moving the cutter along longitudinally of the file-blank, a mechanism for varying the feed of the cutter as occasion may require.

For supporting the file-blank I make use of a rocker-bed in connection with the stationary bed. This rocker-bed is a common appendage of file-cutting machines, and therefore is not of my invention. It is represented in the drawings at $a$ as sustained within and by the stationary bed A, and so as to be capable of freely turning transversely on its longitudinal axis, which is on a level with the upper surface of the stationary bed, the file-blank $b$ being supported within and by such rocker-bed.

The stationary bed A is sustained by or makes part of the frame B of the machine, and has in rear of it, and duly supported by parallel guides $c\ c$, a movable cutter carriage, C, which supports a driving-shaft, $d$, whose axis is arranged on or approximately on a level with the upper surface of the stationary bed, and so as to be as near as possible on a level with the top surface of a file-blank when supported by the rocker-bed.

The carriage C has combined with it and the cutter stock or carrier E a rotary or vibratory supporter, F, which turns on the shaft $d$ as a center and against the front face of the carriage C, and serves also to support in suitable guides or projections, $e$, the cutter carrier E. A cam or wiper, $f$, fixed on the shaft $d$, serves to elevate the cutter-carrier, such carrier being depressed by means of a spring, G, which has one end connected with the carrier. The other end of the spring is supported by a lever, $g$, which turns on a fulcrum, $h$, projecting from an adjustable slide, $i$, fastened to the rotary supporter F by a clamp-screw, $k$. A pitman, $l$, is connected or jointed at its lower end to the lever $g$, and has its upper end resting against the lower edge of a stationary bar, $m$, which is fixed to the frame B. The lower edge of the bar $m$ is curved or shaped so as to permit the pitman to either rise or fall more or less, as occasion may require, while the cutter may be moving over the file lengthwise, the same being for varying the pressure or active power of the spring G in such manner or in such degree as to cause the cutter to enter the file-blank a like depth throughout its length and however the width of the blank may vary.

The resistance of the file-blank to the penetrative power of the cutter must be the greatest where the blank is the widest and the least where it is the narrowest, and were it not for the lever $g$ the pitman $l$ and the bar $m$, formed as described, the indentations made in the blank by the cutter would not have a like depth throughout the surface of the blank, but would be the deepest where the file is the narrowest.

The form of the lower edge of the bar $m$ is to be such with respect to that of the file to be cut as to produce such a variation of the force of the blows of the cutter as may cause them to produce the required depth of cut however the width of the blank may vary.

I am aware that it is not new to combine with a movable bed, and a cutter stationary relatively to such bed, except in having up and down movements over the bed, a mechanism for producing a change in the effective power of the spring for depressing the cutter, the same being shown in Letters Patent No. 8,199 of United States Patents, granted on July 1, 1851, to John Crum, and therefore I lay no claim to such, my improvement having reference to the arrangement of such mechanism with the frame of the machine, a stationary bed, and a movable cutter-carriage. Furthermore, over the said cutter-carriage and secured to the frame B by clamp-screws $m\ n$, passing through slots $o\ o$, there is a plate, H, within which there is a long curved slot, $p$, which receives the central joint-pin, $q$, of a pair of toggles or progressive levers, I K, one of which is jointed to the carriage C, as shown at $r$, while the other is jointed to the rotary or vibratory supporter F, as shown at $s$ in Fig. 2, the stationary part $t$ of the joint $s$ being slotted and affixed to the supporter F by a clamp nut $t^2$.

During the movement of the carriage C so as to cause the cutter to pass along the file-blank the slot $p$, acting on the toggles, will vary their angle of separation from one another so as to rotate or move on its axis the supporter F in a manner to vary the angle of inclination of the chisel of the stationary bed, the variation being such as to cause the chisel to make the same or the necessary angle with the surface of the file on whatever part of such surface it may be cutting. It will be evident that the form of the slot $p$ may be varied so as to vary the inclination of the cutter in such manner as may be desirable while it may be passing along the file.

I would remark that, instead of applying directly to the cutter mechanism as described for varying its inclination with the bed in manner and for the purpose set forth, the said bed may have such a mechanism, or its equivalent, applied to it so as to tip it more or less longitudinally while the cutter may be advancing along the file, the object of the tipping of the bed being to maintain the cutter at the proper or uniform inclination with that surface of the file blank which the cutter may be in the act of indenting. This latter modification of the machine would be an equivalent for my invention, and I mention it merely to show one of the modes in which I have contemplated the application of such part of my invention—viz., that part by which the inclination of the cutter is varied relatively to the bed, and for the purpose of producing uniformity in the slant or the desirable slant of the teeth made in the file.

The next part of my machine to be described is that for moving the cutter-carriage.

A screw or worm, L, fixed on a shaft, $u$, (whose boxes are supported in brackets $v\ v$, extending from the carriage,) engages with a rack, M, which rests on a rail, N, of the frame B. The worm is revolved by means of a pawl, $v^2$, supported by a rocker-arm, $w$, and working into a ratchet, $x$, fixed on the shaft $u$ of the worm. The rocker-arm turns on the shaft $u$, and is vibrated up and down by means of an eccentric, $y$, fixed on the driving-shaft, and connected with the arm by a yoke, $z$, and a rod, $a'$, the whole being as shown in Figs. 3, 4, and 5, the latter figure representing the ratchet and its operative mechanism in side view. The rack being supported by the rail N of the frame B, it follows that when the worm may be in revolution the cutter-carriage C will be moved along with respect to the bed or the file-blank.

The mechanism for varying the feed of the cutter so as to cause in to make the teeth finer in some parts of the blank than they may be in others, as occasion may require, may be thus explained.

The rack M, instead of being firmly fastened to the rail N, is so applied thereto as to be capable of being slid or moved endwise thereon, and there extends down from the front side of the rack a wedge or triangular plate, $b'$, the same being as represented in Fig. 6, which is a front view of the rack and its plate $b'$. A trapezoidal plate, $c'$, is placed between the plate $b'$ and a vertical plate or bar, $d'$, fixed to the rail N, the whole being as shown in Fig. 6. From the plate $c'$ two pins or studs, $e'\ e'$, project and embrace a shaper or curved bar, $f$, which is formed as shown in Fig. 7, and is fixed to the rear surface of the cutter-carriage.

During the advance movement of the cutter-carriage, occasioned by means of the action of the worm on the rack, the operation of the shaper $f'$ on the plate $c'$ will be such as to cause such plate to have a vertical motion, either upward or downward. The upward movement of the plate $c'$ will operate to cause such plate to move the rack M longitudinally and so as to produce an additional movement of it beyond that imparted to it by the worm L. In this way an increase of the feed of the cutter-carriage will be produced.

In case the feed of the cutter-carriage is to be diminished with respect to that which the worm would naturally impart to it by acting on the rack, the shaper $f'$ should be so formed as to cause the plate $c'$ to move downward. The downward movement of the plate $c'$ will permit the rack, under the pressure exerted on it by the worm, to move back more or less, so as to diminish the feed which would naturally be imparted to the cutter-carriage by the worm were the rack stationary relatively to the said carriage. In this way the feed of the cutter may be varied by the action of the shaper $f'$, the plates $b'$ $c'$, and the movable rack M, operating in combination with the worm.

I am aware that in the file-cutting machine of Nicholson, patented April 5, 1864, and described in Letters Patent No. 42,216 of United States Patents, a movable bed has applied to it a mechanism for varying the feed-motion of the bed and for the purpose of causing the cutter to cut finer or coarser teeth, as might be desirable. Therefore I do not claim such, as my improvement for varying the feed consists in a new mechanism and its arrangement with the machine-frame and a movable cutter-carriage operating with a stationary bed.

What I do claim as my invention is as follows:

1. My improved file-tooth-cutting machine as made with the stationary bed A, the movable cutter-carriage C, the rotary or vibratory cutter-stock supporter F, and the sliding cutter or the stock thereof, arranged and combined substantially in manner and with operative mechanism, so as to operate as specified.

2. In combination with the machinery for making the cuts or indentations in the file-blank, a mechanism, substantially as described, for automatically varying the inclination of the cutter relatively to the bed, so as to maintain such cutter at the same or approximately the same angle with the varying surface of the file-blank during the process of making the teeth thereon, however such surface may differ from a plain surface.

3. The arrangement of the lever $g$, the pitman $l$, and the bar $m$ with the frame B, the spring G, the cutter-carriage C, or its rotary or vibratory supporter F, such lever, pitman, and bar being mechanism for varying the pressure or active power of the spring by which the blow of the cutter is obtained.

4. The mechanism or combination for varying the feed of the cutter as occasion may require, such combination consisting of the shaper $f'$, the plates $b'$ $c'$, bar $d'$, and the studs $e'$ $e'$, the whole being applied together and to the movable rack M and the cutter-carriage, substantially as and so as to operate as described.

5. The combination composed of the following mechanical elements, viz: first, a stationary bed; second, a mechanism for moving the cutter longitudinally over the file-blank; third, a mechanism, substantially as described, or its equivalent, for varying the feed of the cutter as occasion may require.

6. The mechanism or combination for so varying the inclination of the cutter relatively to the bed as to maintain such cutter at the same or approximately the same angle with the varying surface of the file-blank during the process of making the teeth thereof, such combination consisting of the slotted plate H, the toggles I K, and the rotary or vibratory supporter F, or their mechanical equivalents, they being combined together and with the frame B and the cutter-carriage, substantially in manner and so as to operate as specified.

ELISHA O. POTTER.

Witnesses:
FREDERICK A. POTTER,
MASSENA P. BACON.